D. D. SWEM.
ELECTRIC FLASHER.
APPLICATION FILED JUNE 27, 1908.

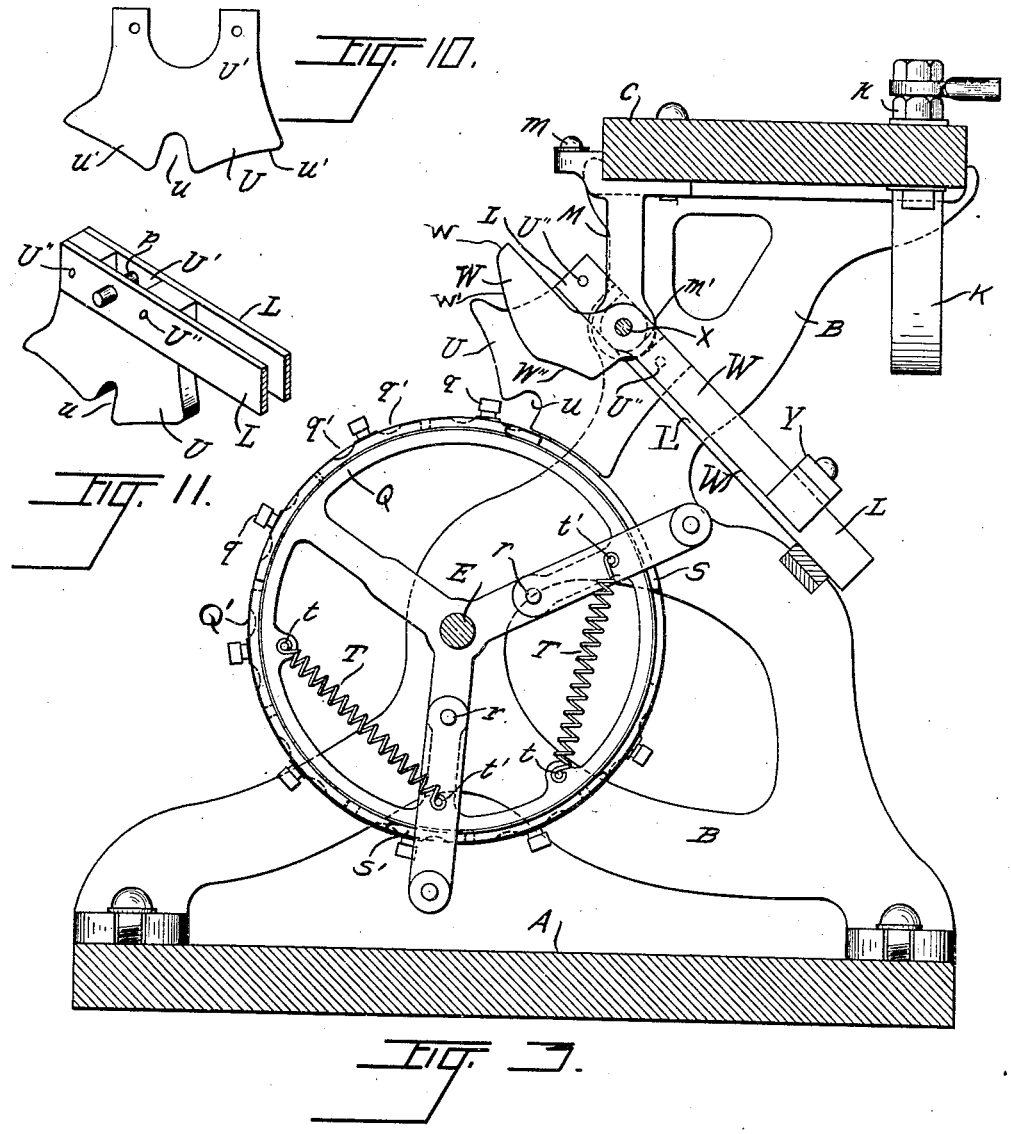

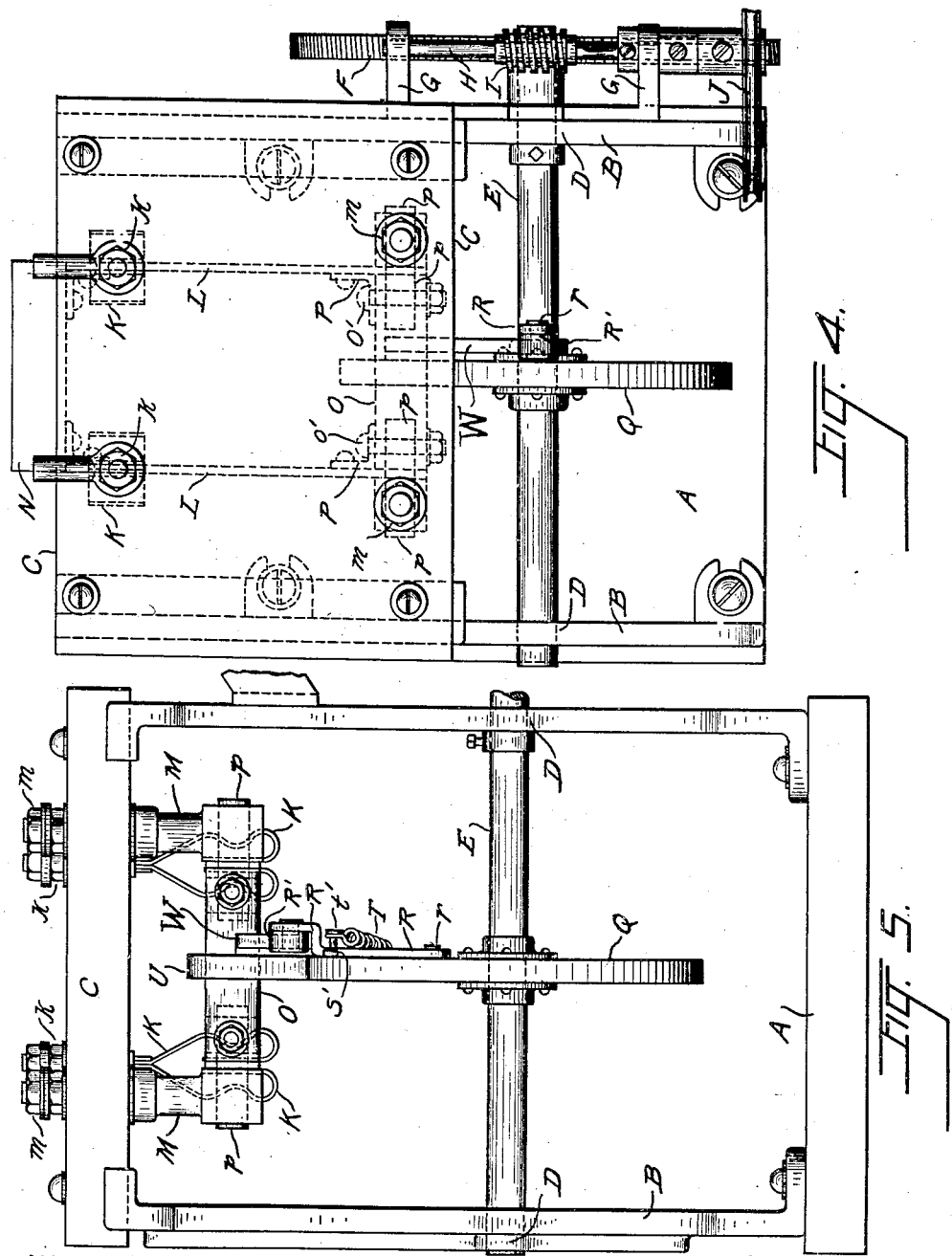

933,137.

Patented Sept. 7, 1909.
6 SHEETS—SHEET 5.

WITNESSES:
C. A. Adams
Edward J. Brown

INVENTOR
Daniel D. Swem
BY
Charles Turner Brown,
ATTORNEY

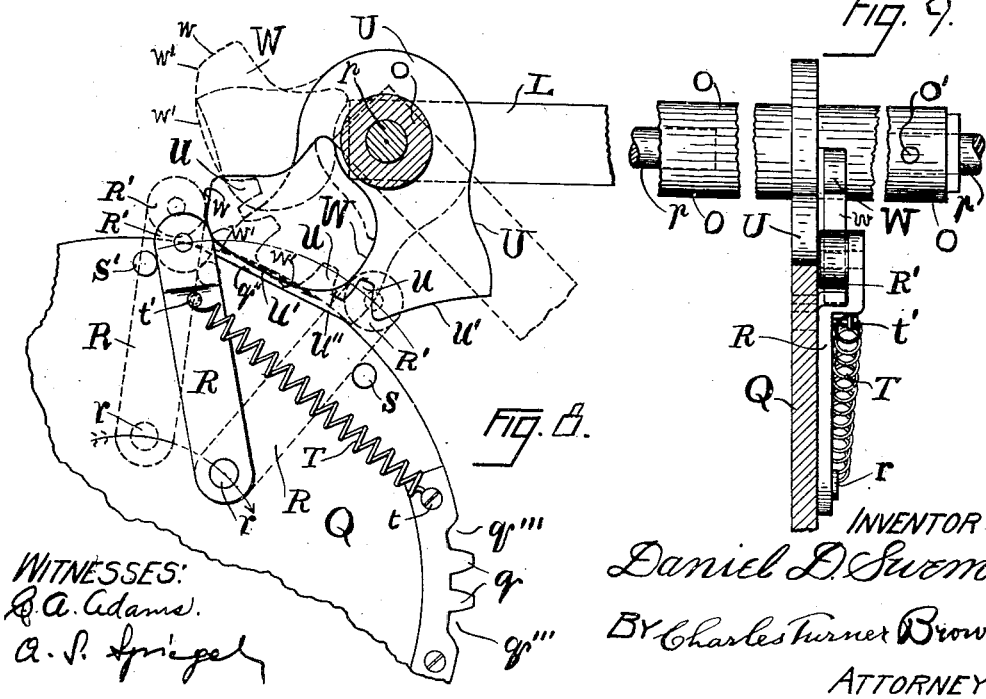

UNITED STATES PATENT OFFICE.

DANIEL D. SWEM, OF CHICAGO, ILLINOIS.

ELECTRIC FLASHER.

933,137.

Specification of Letters Patent.  Patented Sept. 7, 1909.

Application filed June 27, 1908. Serial No. 440,716.

*To all whom it may concern:*

Be it known that I, DANIEL D. SWEM, a citizen of the United States, and a resident of Chicago, in the county of Cook and State of Illinois, have invented certain new and useful Improvements in Electric Flashers, of which the following, when taken in connection with the drawings accompanying and forming a part hereof, is a full and complete description, sufficient to enable those skilled in the art to which it pertains to understand, make, and use the same.

This invention relates to improvements in the class or kind of electric distribution machines known as electric flashers and used principally to cause alternate energizing and deënergizing of electric light circuits, at predetermined intervals.

One of the objects of this invention is to obtain a device in the operation whereof the movable switch lever is mechanically impelled into and out of circuit closing position and is at all times in gear to insure positive pre-determined movement.

Another object of the invention is to obtain a device of the kind named which may be readily put into operation by persons not particularly skilled in the electrical art, and which will require but little motive power to operate it.

A further object of the invention is to obtain a device which may be run at varying rates of speed, without fear of "sparking" as it is termed, when the circuit is broken thereby.

A further object of the invention is to improve the construction of devices of the character named, to lessen the cost of construction and increase the durability of the device.

Figure 1:
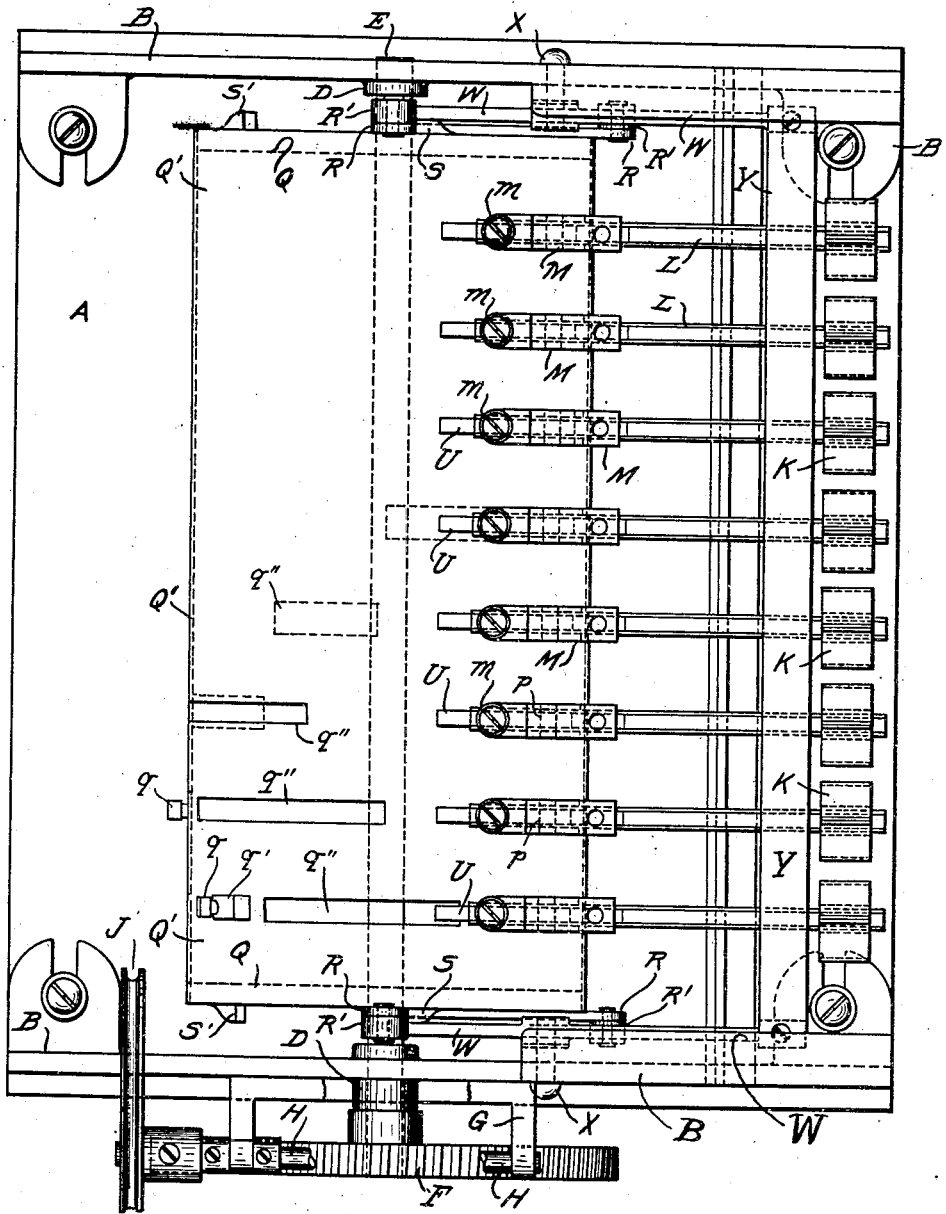
Figure 2:
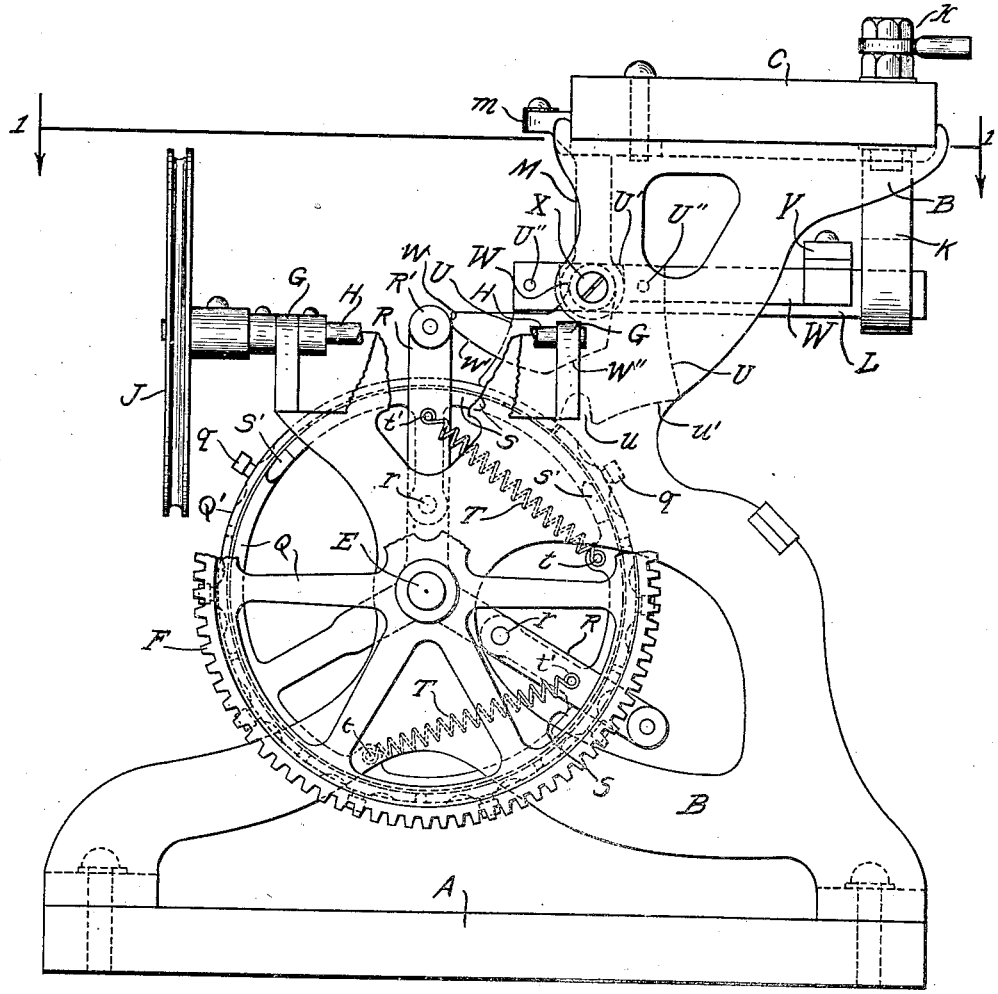

In the drawings referred to I have illustrated, in Figures 1, 2 and 3 the construction of a flasher known as a one pole switch, embodying the invention, and in Figs. 4 to 7, both inclusive, I have illustrated a construction known as a two pole switch. As the principal difference between such constructions consists in tying two of the movable switch blades of the device together in the two pole switch while in the one pole switch a single switch blade is moved into electrical contact with a stationary member of the switch and all the blades are (usually) moved out of such contact simultaneously, parts appearing in both constructions are lettered with the same reference letter.

Figure 6:
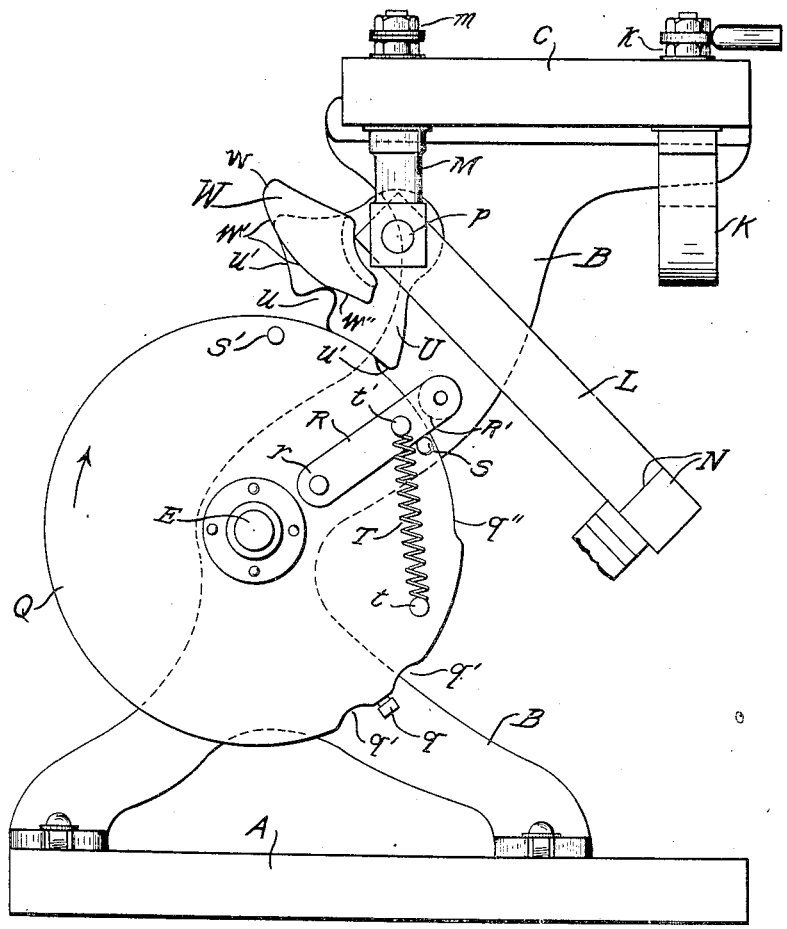

Fig. 1 is a top plan view of a construction embodying the invention, known as a one pole switch, or flasher, with the sub-base thereof removed therefrom. Fig. 2 is an end elevation of a one pole flasher with parts of the driving wheel and frame broken away. Fig. 3 is an elevation of the operative parts of the device immediately adjacent to one of the standards, showing the bases, the driving shaft, a pivot and a stop in cross section. Fig. 4 is a top plan view of a construction embodying this invention in the form known as a two pole flasher. Fig. 5 is a front elevation of the device shown in Fig. 4 in plan view, with the driving shaft broken away at one end. Fig. 6 is an end elevation of the device illustrated in Figs. 4 and 5, with the movable switch lever thereof down. Fig. 7 is a like end elevation of the device illustrated in Fig. 6, on a reduced scale, with the movable switch lever thereof up. Fig. 8 is a modification of some of the parts of the device, shown in end elevation. Fig. 9 is a front elevation of the several parts which are illustrated in Fig. 8. Fig. 10 is a side elevation of an element of the construction illustrated in Figs. 1, 2 and 3. And Fig. 11 is a perspective showing the element illustrated in Fig. 10 in proper relative position with one end of one of the movable switch levers of the device.

A reference letter applied to designate a given part is used to indicate such part throughout the several figures of the drawings, wherever the same appears.

I will first describe the construction illustrated in Figs. 1, 2, 3, 10 and 11, forming what is known in the trade as a single pole electric flasher. A is the base, B, B, are standards secured to base A, and C is a sub base secured on standards B, B. Base A and sub base C are usualy made of slate, to obtain non-electric conducting tables on which the several switches may be secured, insulated from each other. D, D, are journal bearings in standards B, B. E is a shaft rotatably mounted in bearings D, D. F is a worm wheel rigidly secured to shaft E. G, G, are bearings attached to one of the standards B, B. H is a shaft rotatably mounted in bearings G, G. A worm is rigidly mounted on shaft H to turn therewith, and arranged to intermesh with the teeth of worm wheel F. The shaft H is broken away at the point therein where the worm is attached, in Figs. 1 and 2, but it is in all respects similar to worm I shown in Figs. 4, 5 and 6, and intermeshes with worm wheel F as there shown. J is a driving wheel secured on shaft H, by means of which such shaft is rotated when the device is operated. K, K, are spring jaws attached to the under side of sub base C, forming the stationary members of the several switches of the device. k, k, are binding posts in electrical connection with jaws K. L, L, are pivotally mounted switch blades, forming the movable members of the switches of the devices. M, M, are standards on sub base C, secured to the under side of such sub base. p, p, are pivots extending through standards M, M, and blades L, L, to form the pivots on which such blades turn while moving in to and out of engagement with the spring jaws K. m, m, are the terminals of standards M, M. In this single pole construction a standard M is used to each switch blade L. The blade L is forced into mechanical and electrical connection with the spring jaws K by the following mechanism. Wheels Q, Q, rigidly mounted on shaft E are connected or joined by drum Q', and such drum is provided with the gear teeth q, q, (which as shown respectively consist of the head of a bolt or set screw), arranged to engage with a recess in the about to be described sector U. The drum Q' is provided with cut out or flattened portions q', q', adjacent to the teeth q, q, to permit the sector to turn when such teeth engage with the recess in the sector. U is the sector, u is the recess therein with which tooth q engages: and u', u', are concave faces on sector U, which substantially correspond with the peripheral face of the drum Q'. U' is a recess in sector U, which permits standard M to be inserted between the strips of metal forming the switch blade L. The lever L when not in contact with spring jaws K, (that is when in the position illustrated in Figs. 3 and 6), is locked in such position by the engagement of the periphery of drum Q', Fig. 3, (or wheel Q, Figs. 4, 5 and 6) with the right hand one of the faces u'; during the time such lever is moving up into engagement with the jaws K the tooth q is engaged in recess u; during the time such lever is in contact with jaws K such lever is locked in place by the engagement of the periphery of drum Q', Fig. 3 (or wheel Q, Figs. 4, 5 and 6) with the left hand one of the faces u', and during the time such lever is moving down from contact with the jaws K, the end of lever R (or the pulley R') is in engagement with the abutment W; so that such lever is at all times engaged or in gear with a device which controls its position. The switch blade L is made of two strips of metal, preferably copper, and the sector U is placed between such strips, at one end of the switch blade, and there secured by the pins U'', U''.

To mechanically separate the blades L, L, from the spring jaws K, K, and at the same time avoid sparking at the instant of such separation, levers R, R, are mounted on the wheels Q, Q, on pivots r, r; stops S, S' are attached to the wheels Q, Q; and spring T is attached at one end, (as at t), to the wheel Q and at the other end, (as at t'), to the lever R. Stops S, S' limit the movement of the lever R, in the operation of the device. Spring T is arranged to yieldingly hold the lever R against the stop S at which time it is parallel to a radius of such wheel Q. R' is a roller on the outer end of lever R. W is an abutment against which the roller R' is forced by the rotation of the shaft E in the operation of the machine. X is a bolt forming the pivot of abutment W. Bolt X and the several pins or pivots p, p, are in line so that the abutment W and the movable blades L turn around the same center. Abutment W is provided with end w, the curved under side w', and the end w''. Y is a universal bar secured at its ends to the upper side of the abutments W, W, so as to extend over the several blades L. q'' is a flattened portion of drum q', to permit the turning of the sector U in a direction contrary to the direction of movement of the hands of a clock.

The rotation of shaft E carries lever R against the end w of abutment W, (or carries the roller R' against such abutment): and such lever and roller are held from turning while the pivoted end of the lever is drawn down by the continued rotation of wheel Q and pivot r. Such roller R' is held by the abutment W until the roller is drawn down on face w, into contact with face w'. The holding of roller R' stationary, as last above described puts additional strain on the spring T, as pivot r continues to rotate, and roller R' is thereby drawn down into contact with face w' of abutment W. Stop S' is arranged to force the end of lever R on which the roller R' is mounted, forward, as soon as such roller is in contact with such face w', and thereby turn the abutment around on its pivot. At such time the spring T may draw the lever R forward to its initial position, in contact with the stop S, thus turning the abutment W and the blades L down. The flattened portion q'' of drum Q' is in proper relative position at the time the blades L are returned, as last above described, to permit the sector U to turn in the same direction the blades and abutment turn, (in the direction contrary to the movement of the hands of a clock). When the blades L are in the position last above described, that is, out of engagement with the spring jaws K, they are so held by the face $u'$ of sector U which is adjacent to the drum Q', and when such blades are up they are held up by the one of the faces $u'$ which is at such time adjacent to such drum.

The spring T need not be sufficiently strong to turn the blades L out of engagement with the jaws K against the friction of such jaws K, as such blades are forced out of engagement with such jaws by the moving of the abutment W as such abutment is forced around by the roller R' on lever R: the function of such spring being simply to move the blades around on their respective pivots from the instant the friction of the jaws K ceases: so as to move such blades quickly away from the jaws and avoid sparking. In case the spring T does not complete the movement of the abutment and of the blades the roller R' will force the completion of the movement of such abutment and blades.

In Fig. 1 a plurality of levers R are shown, each of such levers pivoted on wheel Q. The operation of one is the same as is the operation of the other.

In a two pole switch embodying this invention two switch blades, L, L, are attached together, to form a gang. The two pole switch is illustrated in Figs. 4, 5, 6, 7, 8 and 9, and so far as the construction thereof is a modification of the hereinbefore described construction, or varies therefrom, it is as follows: Sector U is mounted on shaft O and rigidly attached thereto. The tooth $q$ is attached directly to wheel Q and as many wheels Q are rigidly secured to shaft E as there are gangs of switch blades L. The drum Q' is not used. The blades L constituting a gang are joined together at one end by bar N and at the other end by the shaft O, such bar and shaft, respectively, being made of non-electric conducting material, as rubber, indurated fiber, wood, or the like. The blades L are moved into and out of mechanical and electric connection with the spring jaws K by the turning of the shaft O, and to rigidly secure such blades and shaft together I have used the angle pieces P, P, and pins O', O'. The pins or pivots $p, p$, are shown as I construct the same, and extend into the shaft O. Pin O' extends through such pins or pivots $p, p$, respectively, to lock them in such shaft O. The blades L constituting a gang are mechanically joined together, by the construction described, while at the same time they are electrically insulated from each other. The abutment W is mounted on the shaft O, and may be (and has by me been constructed) integral with the sector U, in this two pole construction, there being as many of such abutments used as there are gangs of switch blades L. The universal bar Y is, therefore, not required in this two pole construction.

The modification illustrated in Figs. 8 and 9 consists simply in having a plurality of teeth $q$ on wheel Q and a corresponding number of recesses $u$ in sector U. Figs. 8 and 9 are drawn to an enlarged scale.

In the two pole construction the flattened portions $q'$ and $q''$ of the drum Q' are transferred to the wheels Q, and are there lettered with the same letters. The recesses $q'''$, Fig. 6, perform the same functions as the flattened portions $q'$, that is, permit the sector U to turn when such recesses are in proper relative position to the sector.

Having thus described my invention, what I claim as new and desire to secure by Letters Patent is,—

1. The combination of a knife switch comprising stationary jaws and a movable blade arranged to co-act with the jaws, a sector attached to the blade to turn therewith, such sector provided with a recess, a rotatable shaft, a gear tooth arranged to engage with the recess on the sector, such gear tooth arranged to be turned in a circle concentric to the shaft by the rotation of such shaft, a pivotally mounted lever, the pivot whereof is arranged to be turned in a circle concentric to the shaft on the rotation of the shaft, stops arranged to limit the movement of the lever on its pivot and a spring arranged to yieldingly hold the lever in position against one of the stops, a pivotally mounted abutment and a connection between the abutment and the switch blade, such lever, abutment and switch blade relatively associated so that the end of the lever is moved into contact with the abutment and such end is held from rotating until the pivot of the lever draws the end thereof under the end of the abutment and the remaining stop arranged to force the end of the lever under the abutment and turn such abutment on its pivot, and such spring arranged to return the lever to its initial position as the end of the lever moves under the abutment; substantially as described.

2. The combination of a base, standards on the base, a sub-base, on the standards, with spring jaws on the subbase, a terminal to the spring jaws, a switch blade arranged to be turned into and out of electrical engagement with the spring jaws, a terminal on the sub-base to the blade, a shaft rotatably mounted in the standards, a lever, a pivot on which the lever is mounted, such pivot mounted on the shaft to be moved in a circle by the rotation of the shaft, a stop and a spring, such spring attached to the lever and arranged to yieldingly maintain such lever in contact with the stop and with the lever extending radially from the shaft, an abutment, a pivot on which the abutment is mounted and a connection between the abutment and the blade so that rotation of the abutment in one direction moves the blade out from electrical contact with the spring jaws, and such lever and abutment relatively associated so that rotation of the shaft moves the end of the lever against the abutment and such abutment holds the end of the lever until the pivot of such lever moves to draw such end under such abutment, and the movement of the lever under the abutment turns the abutment on its pivot in the direction to move the blade out of contact with the spring jaws; substantially as described.

3. The combination of spring jaws provided with a terminal, a movable blade provided with a terminal and arranged to co-act with the jaws, a sector provided with a recess connected to the movable blade to move therewith, a rotatable shaft, a gear tooth connected to the shaft and arranged to engage with the recess on the sector, a lever pivotally mounted and connected to the shaft so that rotation of the shaft moves the pivot in a circle concentric with the shaft, means to limit the movement of the lever on its pivot, means to yieldingly hold the lever in its initial position, a pivotally mounted abutment and a connection between the abutment and the blade so that movement of the abutment in one direction on its pivot moves the blade, and such lever and abutment relatively arranged so that rotation of the shaft carries the end of the lever against the abutment and such lever is held by the abutment to increase the tension of the spring until the pivot of the lever is carried by the rotation of the shaft to bring the end of the lever to the under side of the abutment, to permit the spring to force the lever to its initial position and move the abutment on its pivot; substantially as described.

4. The combination in an electrical flasher provided with spring jaws and with a pivoted blade arranged to be moved into and out of contact with the spring jaws, of a pivotally mounted abutment, a connection between the abutment and the blade, a lever, a rotatable shaft, a connection between the lever and the shaft, a spring arranged to yieldingly hold the lever in its initial position and so that one end thereof is moved into contact with the abutment by the rotation of the shaft and such end is thereby held to move the lever from its initial position and increase the tension of the spring upon the continued rotation of the shaft until such end is drawn from the abutment to permit the return of the lever to its initial position by the spring, and such lever and abutment arranged so that the return of the lever to its initial position moves the abutment and forces the blade out of engagement with the spring jaws; substantially as described.

5. A movable abutment provided with an end and with an inclined under face, and a switch consisting of spring jaws and a movable blade, such blade arranged to close the switch when forced between the jaws, in combination with a pivot arranged to move in a given path, a lever mounted on the pivot, means to yieldingly hold the lever in a determined position, means to move the pivot along its determined path and bring the lever into contact with the end of the abutment and to continue the movement of the pivot to bring the lever into contact with the inclined under face of the abutment and move such abutment, the movable abutment and the movable blade relatively associated so that such moving of the abutment forces the blade out from between the spring jaws and opens the switch.

6. A rotatable abutment provided with an end and with an inclined under face, and a switch consisting of spring jaws and a movable blade arranged to close the switch when forced between the jaws, in combination with a rotatable shaft, a pivot arranged to move in a circle concentric to the shaft on the rotation of the shaft, a lever mounted on the pivot, means to yieldingly hold the lever in a determined position, and means to rotate the shaft to bring the lever into contact with the end of the abutment and to continue the rotation of the shaft to bring the lever onto the inclined under face of such abutment, and move such abutment and the movable blade and abutment relatively associated so that such moving of the abutment forces the blade out from between the spring jaws and opens the switch.

DANIEL D. SWEM.

In the presence of—
CHARLES TURNER BROWN,
CORA A. ADAMS.